United States Patent [19]

Balducci et al.

[11] Patent Number: 6,103,209

[45] Date of Patent: *Aug. 15, 2000

[54] PROCESS FOR PREPARING POROUS SPHERICAL SILICA XEROGELS

[75] Inventors: Luigi Balducci, Mortara; Raffaele Ungarelli, Trecate, both of Italy

[73] Assignees: Enichem S.p.A.; Eniricerche S.p.A., both of Italy

[ * ] Notice: This patent issued on a continued prosecution application filed under 37 CFR 1.53(d), and is subject to the twenty year patent term provisions of 35 U.S.C. 154(a)(2).

[21] Appl. No.: 08/628,978

[22] Filed: Apr. 8, 1996

Related U.S. Application Data

[63] Continuation of application No. 08/332,094, Oct. 31, 1994, abandoned.

[30] Foreign Application Priority Data

Nov. 4, 1993 [IT] Italy .................................. MI93A2331

[51] Int. Cl.$^7$ ..................................................... C01B 33/12
[52] U.S. Cl. ............................................. 423/338; 423/339
[58] Field of Search ...................................... 423/338, 339

[56] References Cited

U.S. PATENT DOCUMENTS

| | | | |
|---|---|---|---|
| 5,011,669 | 4/1991 | Tsuchiya et al. | 423/338 |
| 5,250,096 | 10/1993 | Bruce et al. | 423/338 |
| 5,304,364 | 4/1994 | Costa et al. | 423/338 |

FOREIGN PATENT DOCUMENTS 298062   1/1989   European Pat. Off. .

OTHER PUBLICATIONS

Patent Abstracts of Japan, vol. 12, No.316, Aug. 26, 1988 (JP 63085012 abstract).

Database WPI, Week 8902, Derwent Publications Ltd., London, GB (JP 63291807).

*Primary Examiner*—Steven P. Griffin
*Assistant Examiner*—Stuart L. Hendrickson
*Attorney, Agent, or Firm*—Kramer Levin Naftalis and Frankel LLP

[57] ABSTRACT

Process for preparing porous spherical silica particles substantially consisting in emulsifying an acidic silica sol in a dispersing media, gelifying the microdrops of the sol in the emulsified state and submitting the resulting gel to thermal treatment in the presence of the emulsifier liquid and of sol gelation base.

18 Claims, No Drawings

PROCESS FOR PREPARING POROUS SPHERICAL SILICA XEROGELS

This is a Continuation of the application Ser. No. 08/332,094, filed Oct. 31, 1994, now abandoned.

The present invention relates to a process for preparing porous spherical silica particles substantially consisting in emulsifying an acidic silica sol in a dispersing media, gelifying the microdrops of the sol in the emulsified state and submitting the resulting gel to heat treatment in the presence of the emulsifying liquid and of the sol gelation base; the invention also relates to the so obtained silica xerogels with spherical shape, which can find wide applications as catalyst carriers such as, e.g., the suitable catalysts for olefin polymerization; in particular, the spherical shape of the particles combined with a narrow distribution of diameters is particularly suitable for carrying out catalytic processes in gas phase on fluidized bed.

Finally, silica xerogels characterized by a specific surface area comprised within the range of from 200 to 600 $m^2/g$, by a pore volume of >1 $cm^3/g$ and a pore diameter comprised within the range of from 80 to 250 Å (Ångstrom), with such xerogels being useable as carriers for catalytic systems for olefin polymerization, are a further object of the present invention.

These and still other features of the invention will become clearer from the following disclosure.

The process for preparing porous spherical silica particles according to the present invention essentially comprises the following steps:

(A) preparing a colloidal silica solution by hydrolizing a silicon alkoxide in an aqueous media in the presence of mineral or organic acids;

(B) possibly dispersing of fumed silica in the colloidal silica solution prepared as disclosed under (A);

(C) mixing the pure (A) or hybrid (B) silica sol in an organic media constituted by higher alcohols having 8 or more carbon atoms;

(D) emulsifying the so obtained mixture;

(E) gelifying the pure or hybrid silica sol by bringing the above obtained emulsion with a basic solution constituted by the emulsifying liquid containing dissolved inorganic bases (e.g., ammonia) or, preferably, organic bases, such as, e.g., amines;

(F) heat treatment (T>50° C.) of the gel in the form of spherical particles, in the presence of the emulsifying liquid and of the sol gelifying base; the so obtained product is finally submitted to finishing treatments, such as: filtration, washing, drying and calcination at a temperature of >400° C. under an oxidizing atmosphere.

It is well known that the granulometric characteristics of particles with spherical shape, in particular their average diameter and diameter distribution, depend on a number of factors, some of which are of physical-chemical character (e.g., interfacial tension and phase viscosities), whilst other of them are more strictly depending on emulsifying technology.

In fact, such an operation can be carried out by means of a large number of systems [P. Becker, Encyclopedia of Emulsion Technology, vol. 1, pages 64–7 (1983)]: for example, mechanical emulsifying systems (fast dispersors or stirrers) can be used, such as those disclosed, e.g., in U.S. Pat. No. 4,089,932; EP 0280673; U.S. Pat. No. 4,106,163: in these cases, for a defined dispersed phase/continuous phase system, the granulometry of particles is basically controlled by the revolution speed of the stirring means.

Such processes suffer from scaling-up problems. In other processes, the production of the emulsion from the two phases is carried out by causing the mixture to flow through nozzles or tubes with suitable geometric (diameter, length) characteristics, as disclosed, e.g., in EP 0255321; U.S. Pat. No. 4,469,648; EP 0162716.

When one operates according to such methodologies, the size of the particles is controlled by the motion conditions (either laminar or turbulent flow, according to whether the Reynolds number is of <2,000 or >3,000); so, e.g., in U.S. Pat. No. 4,469,648; the preparation is disclosed of products with spherical shape which are solid at room temperature, by starting from the same product in the molten state, blended with at least one further immiscible liquid.

The mixture of components is caused to flow through a tube with a suitable size and, subsequently, upon leaving the tube the so formed emulsion is sharply cooled (quenched), so as to cause the dispersed phase to nearly istantaneously solidify.

Such a methodology is applied to either organic or inorganic compounds with melting temperatures comprised within the range of from 20 to 40° C., such as, e.g., urea, waxes, organic and inorganic salt adducts, such as, e.g., Mg halides-alcohols adducts (e.g., $MgCl_2.xC_2H_5OH$).

In still other processes (e.g., according to Italian patent application No. 002743A/91), the emulsifying of the silica sol in immiscible liquids and the granulometric control of the products are carried out on special apparatuses, i.e., microfluidizers, disclosed, e.g., in U.S. Pat. Nos. 4,833,060 and 4,835,084.

By operating with such apparatuses, a ultrafine dispersion of sol drops is obtained which, by coalescing, grow in a uniform fashion until they reach the desired diameter; the so obtained drops are subsequently solidified (i.e., gelified), by adding a second solvent containing a gelifier agent.

The process, based on the use of the particular atomization chamber of the microfluidizer, displays problems of regular operation (blockage of atomizer nozzles), in particular when hybrid silica sols constituted by fumed silica dispersed in the silica sol, are used.

Besides shape, such physical properties as surface area, pore volume, average pore diameter and mechanical strength of spherical silica particles play a basic role when such products are used in catalysis field; so, e.g., it is well known that the activity of catalysts supported on silica carriers for ethylene polymerization is strictly connected with carrier porosity [M. P. Mc Daniel; J. Polym. Sc.; Polymer Chemistry Ed.; vol. 19, 1967–1976 (1981)].

In the field of production of porous silica xerogels, it is known as well that the removal of the interstitial liquid (generally $H_2O$) from the porous gel structure by means of the traditional drying technique generally causes a decrease in pore volume. Different approaches are followed in order to overcome or reduce such phenomena; besides to the classical methods of drying under hypercritical conditions (U.S. Pat. No. 4,042,769; EP 149816; U.S. Pat. No. 4,419,968), which, owing to economical reasons, cannot be used for powder production on large industrial scale, alternative techniques are known such as, e.g., water removal from hydrogel pores in the presence of immiscible liquids capable of yielding azeotropic mixtures (U.S. Pat. No. 3,652,216).

Still other techniques, aiming at preserving the porous structure of the silica gels, generally consist in submitting the silica gel, in particular silica hydrogel, to ageing treatments which perform the function of strengthening the structure thereof. The thermal treatment of silica hydrogels in the presence of oxygen containing organic compounds belonging to the class of water soluble polyfunctional alcohols (such as, e.g., glycols, polyethylene glycols), is disclosed, e.g., in U.S. Pat. No. 4,169,926 in order to produce suitable silica xerogels for use as carriers for olefin polymerization catalysts; U.S. Pat. No. 4,104,363; discloses treating silica hydrogels in the presence of glycols, organic esters (e.g., amyl acetate) or alkanolamines (Italian patent No. 2741A/91), in order to produce high porosity silicas.

The subject-matter of the present invention is a process for producing spherical silica particles with an average diameter comprised within the range of from 10 to 100 micrometers and with a narrow diameter distribution, which process essentially consists in emulsifying an acidic silica sol, synthetized by starting from silicon alkoxide, by operating in higher alcohols, and in subsequently gelifying the sol by bringing it into contact with an alkaline solution.

Such a process also enables the process to be carried out with hybrid silica sols, with the advantage that the range of xerogels produced and, in particular, the microstructural characteristics in terms of surface area, total porosity, average diameter of pores and pore diameter distribution, can be extended.

A further object of the invention is the use of hybrid silica sols consisting of dispersed silica in the silica sol synthetized from silicon alkoxide.

Integrating part of the invention furthermore is the process of gel ageing in the presence of the alcohol and of the base respectively used in sol emulsifying and gelation. Such an operation makes it possible the characteristics of specific surface area, total porosity, average diameter of pores, to be controlled.

In the process according to the present invention, a silica sol is preferably used which is prepared by means of the acidic hydrolysis of silicon alkoxide, such as, e.g., tetramethoxy- or tetraethoxy-silicate $[Si(OR)_4]$, by following the known technique from the prior art, see, eg. Italian patent application No. 20126/90; preferably, those silica sols are used which are prepared by hydrolizing tetraethoxy-silicate (TEOS) in water, by operating with a molar ratio of $H_2O$/TEOS comprised within the range of from 8 to 32 and in the presence of mineral or organic acids in such an amount that the pH value is comprised within the range of from 1.5 to 3. More preferably, the process is carried out with values of molar ratio of $H_2O$/TEOS comprised within the range of from 16 to 25, with the hydrolysis being carried out at variable pH values within the range of from 2.2 to 2.8 and at temperatures of $\leq 40°$ C.

For exemplifying purposes, hydrochloric acid, sulfuric acid, nitric acid; and malonic acid and para-toluene-sulfonic can be used as the mineral and, respectively, organic acid. According to the value of the molar ratio of $H_2O$/TEOS, the silica concentration in the sol may be comprised within the range of from 75 to 160 g/l and preferably of from 80 to 120 g/l.

In order to obtain porous products specifically designed for use as carriers for catalytic systems for olefin polymerization, in the colloidal solution from the (A) step preferably fumed silica is dispersed, so as to obtain hybrid silica sols [(B) step].

Under "fumed silica", commercially known with the names of "Aerosil" or "Cab-O-Sil", those silicas are meant which are obtained by hydrolizing silicon tetrachloride in an oxygen-hydrogen flame, see, e.g. [Temple, Patton, Pigment Handbook, vol. 1, pages 167–87, 1973]. For preparing hybrid sols, fumed silicas with specific surface area comprised within the range of from 50 to 300 $m^2$/g, can be used.

The use of such sols is known from pertinent technical literature in order to obtain monolithic silica particles by means of sol-gel tecnology as disclosed, e.g., in U.S. Pat. No. 4,801,318.

The use of hybrid silica sols according to the present invention makes it possible particles to be obtained which have an inner homogeneous structure free from macroscopic hollows which are more or less detectable when the process is carried out in the presence of lower alcohols (such as, e.g., ethanol contained in the silica sot synthetized from TEOS). The weight or molar ratio of fumed silica $[(SiO_2)_p]$ to the silica present in the silica sol $[(SiO_2)_s]$ can be comprised within the range of from 0.1 to 3, preferably of from 0.1 to 2.

The fumed silica can be directly pre-dispersed into the silica sol according to the known technique from the prior art for obtaining monolithic particles (U.S. Pat. No. 4,801,318).

The preferred procedure consists in separately dispersing the fumed silica in water; the so obtained dispersion is then mixed with the silica sol. The operation of preliminarily dispersing fumed silica in water is preferably carried out with fast dispersors; those of rotor-stator type, such as, e.g., Ultraturrax sold by Ika-Werk, resulted to be particularly effective for the desired purpose. The concentration of fumed silica in water can be comprised within the range of from 80 to 150 g/l; the process is normally carried out under acidic pH conditions (pH 2–3), in order to improve the stability of the resulting dispersion. The step of mixing silica sol with fumed silica dispersion can be carried out by using mechanical stirring systems (e.g., paddle stirrers), or, more preferably, with fast dispersors and ultrasound probes.

In order to obtain spherical particles of silica displaying the granulometric characteristics according to the present invention, controlling the molar ratio of (total ethyl alcohol)/(total silica) $[(EtOH)_t/(SiO_2)_t]$—wherein under "total ethyl alcohol" both that alcohol amount which derives from the tetraethoxy ortho-silicate precursor, and that alcohol amount which is added to the sol—are meant.

When one operates with a silica sol prepared from TEOS, such a ratio is 4; when hybrid sols are used, it is necessary that the ratio of $(EtOH)_t/(SiO_2)_t$ is >3.

As it was previously stated, the pH value of the silica sol synthetized from TEOS can be comprised within the range of from pH 2 to pH 3; within such a pH range also the preparation of hybrid silica sols is carried out.

The either pure or hybrid sol, prepared under such conditions as disclosed above, is subsequently premixed in the organic media (the continuous phase) which is constituted by monofunctional aliphatic alcohols or mixtures thereof, with such alcohols being characterized by a number of carbon atoms of $\geq 8$, viscosity values of $\geq 8$ cps, surface tension values of about 30 dynes/cm and dielectric constant values (E>4) higher than of corresponding aliphatic hydrocarbons; the latter characteristic proved to be advantageous for the purpose of sol gelation control, by favouring the dissociation of the base. In the process according to the present invention, for example, n-octanol, n-nonanol, n-decanol, n-undecanol, n-dodecanol or their isomers, such as, e.g., ethylhexyl alcohols, can be used; mixtures of said alcohols or industrial products constituted by isomeric mixtures, can be used as well. The process is preferably carried out with n-decanol, or its homologous species, such as ethylhexanol.

The silica sol is mixed with organic media by operating, e.g., in mechanically stirred reactors; in that case, the stirrer should be such as to make it possible a homogeneous mixture to be obtained from the dispersed phase (the sol) and the continuous phase (the emulsifying liquid).

The ratio of (continuous phase)/(dispersed phase) by volume can be comprised within the range of from 2 to 5, and, preferably, of from 2.5 to 3.5; higher ratios do not modify the characteristics of the product to a meaningful extent.

With the emulsifier systems according to the present invention, the blending step can be carried out at a temperature comprised within the range of from 5 to 50° C., with the lower temperature threshold depending on the physical characteristic (melting point) of the emulsifying liquid; such a step is preferably carried out at a temperature comprised within the range of from 20 to 40° C. The blending temperature, by having an effect on system viscosity and on the mutual solubilities of the components of the emulsion, is a parameter which conditions the granulometric characterstics of the products, with the particle size preferentially displaying an increase with increasing mixing temperatures.

The mixture of the components of the emulsion is caused to flow through a tube with suitable geometric characteristics (diameter, length); such an operation can be preferably carried out by pressurizing the blending reactor, according to known techniques from the prior art (U.S. Pat. No. 4,469, 648).

The granulometric characteristics of the product are conditioned by the type of motion of the emulsion during the flowing through the tube. By using the emulsifying mixtures according to the present invention and operating under laminar flow conditions (i.e., Reynolds number of <2,000), the size of the particles resulted to be mainly conditioned by the linear flow speed of the emulsion inside the tube. Under laminar motion conditions, the linear speeds resulted to be normally comprised within the range of from 0.3 to 3 m/sec; under such motion conditions, the granulometry of the products resulted to be comprised within the range of from 10 to 100 micrometers. More preferably, the step is carried out with linear speeds of from 1.2 to 1.9 m/sec, with particles with an average diameter comprised within the range of from 20 to 70 micrometers, and with good size distributions being obtained.

The inner diameter of the tube conditions the silica production capacity. For exemplifying purposes, by operating on a laboratory scale with silica productivity values of up to 2 kg/h, tubes with inner diameter comprised within the range of from 1.8 to 5 mm, and with a length/diameter ratio of >200, resulted to be suitable.

With the geometric characteristics of the tube and the interface (dispersed phase/continuous phase) tension being the same, an increase in linear flow speed causes a decrease in particle size. Under same conditions of linear flow speed, the granulometry of the products resulted to depend on the chemical composition of the sol; so, e.g., by operating with a silica sol synthetized with a molar ratio of $H_2O/TEOS=25$, $SiO_2$ particles are obtained which display longer diameters than as obtained from a silica sol characterized by a molar ratio of $H_2O/TEOS=16$.

As relates to the emulsifying by flowing through a tube, as applied to silica sols, the use of higher alcohols resulted to be particularly advantageous.

After leaving the tube, the emulsion is brought into contact with a basic solution in order to enable the silica sol droplets to solidify (i.e., gelify). Such a solution is normally constituted by the liquid used in sol emulsifying and an organic base soluble in it. The cyclic amines, such as, e.g., cyclohexylamine, or the aliphatic amines with a number of carbon atoms of >10, such as, e.g., octadecylamine, or similar industrial products, such as, e.g., Primene (Rohm and Haas), resulted to be preferable to the aliphatic amines with a lower number of carbon atoms, or to the more hydrophilic ones, such as, e.g., alkanolamines, because they enable a better control to be obtained of sol gelation, displaying a higher stabilizing effect of spherical gel particles.

The volumetric ratio of the gelation solution to the emulsion may be comprised within the range of from 0.1 to 1, preferably of from 0.25 to 0.5; the amount of organic base contained in the gelation solution is at least 10 times as large as the required amount for the stoichiometric neutralization of the acid contained in the silica sol, with the double purpose of enabling the sol droplets to undergo a fast gelation, with simultaneously preventing the particle from aggregating, as it was previously noted.

The gelation step is carried out by feeding the emulsion into the gelation solution with the latter being kept with mechanical stirring so as to secure, in the nearby of the outlet from the emulsifying tube, an effective circulation of the alkalifying solution. The emulsion feed is preferably carried put by keeping the tube not dipped into the gelation liquid, in order to overcome same tube blockage problems.

The gelation temperature can be comprised within the range of from 5 to 50° C.; the process is normally carried out under emulsion temperature conditions. At the end, the dispersion of silica gel microspheres is kept with stirring for 15–30 minutes, in order to secure the complete sol gelation.

The so obtained silica gel is subsequently submitted to ageing in the presence of the emulsifying liquid and of the organic gelation base at the temperature of 50–140° C.; normally, before carrying out such an operation, the product is thickened, e.g., by settling, until silica concentrations are reached which are comprised within the range of from 50 to 100 g/l. The ageing time can be comprised within the range of from 2 to 16 hours. In general, a temperature increase and, to a much more limited extent, an increase in ageing time, has the effect of decreasing the specific surface area and increasing the average pore diameter. This step is preferably carried out within the temperature range of from 70 to 95° C., and with longer ageing times than 4 hours.

The action of heat, jointly with the alkalinity of the media in which the ageing is carried out, strengthens the gel structure, thus avoiding that in the subsequent drying operations, the porous structure of the gel may collapse. By operating under such conditions as disclosed, xerogels are normally obtained which are characterized by porosity values of >1 $cm^3/g$, with a specific surface area comprised within the range of from 200 to 600 $m^2/g$ and with an average diameter of the pores comprised within the range of from 80 to 250 Å.

At the end of the heat treatment, the product is separated, e.g. by filtration, and is repeatedly washed with ethanol in order to remove most decanol and gelifying base. The product is then dried. Such a step did not result to be critical; it can be carried out, e.g., in vacuum, at the temperature of 30–40° C., or under atmospheric pressure.

The product is then submitted to calcination at temperatures of >400° C. under an oxidizing atmosphere, e.g., in air; such a calcination is preferably carried out within a temperature range of from 500 to 550° C. The calcination step is carried out under controlled conditions; in order to favour a gradual decomposition of the organic residue (decanol, amine) adsorbed on the gel, the heating speed is kept at values of <200° C./h and is preferably kept comprised within the range of from 50 to 100° C./h. The residence times at such a temperature may be comprised within the range of from some up to 20 hours.

In order to evaluate the characteristics of the xerogels obtained according to the process of the present invention, the products were calcined at 500 or 550° C. during 10 hours with heating rates of 50° C./h.

The xerogels according to the present invention are described hereinunder in terms of specific pore volume (V), specific surface area (S) and average pore diameter (Dp). The surface area was determined according to the B.E.T. (Branauer, Emmet and Teller), method, the specific pore volume was determined by means of the Dollimore-Heal method, both said methods being known from the prior art. The average pore diameter, expressed as Å, was calculated according to the following known relationship:

$$Dp(Å)=[4\ V(cm^3/g)/S(m^2/g)].10^4$$

The average size of the particles was measured by means of a Malvern analyzer series 2600C. (Instrument Malvern, England) and is expressed in terms of median diameter, $D_{(50)}$, which is the diameter value with half-value ordinate in the line of cumulated size distribution; the ratio of the diameter with 90% ordinate, $D_{(90)}$ to the diameter with 10% ordinate, $D_{(10)}$, was assumed as the index of particle monodispersion degree $[D_{(90)}/D_{(10)}]$.

The xerogels obtained by means of the above disclosed process are constituted by silica powders with spherical shape and with an average diameter of the particles, $D_{(50)}$, comprised within the range of from 10 to 100 micrometers, and with a monodispersion degree, $D_{(90)}/D_{(10)}$, of $\leq 2.5$. The xerogels are characterized by a specific surface area (S) comprised within the range of from 200 to 600 m²/g, a specific pore volume (V) of >1 cm³/g, and an average pore diameter (Dp) comprised within the range of from 80 to 250 Å.

The materials produced according to the present invention are used above all as carriers for catalytic systems, such as, e.g., those for olefin polymerization.

The following examples are supplied for merely illustrative purposes, and are not limitative of the present invention.

EXAMPLE 1

(A) Silica-sol-preparation

A volume of 683 ml of TEOS (tetraethoxyorthosilicate) and 864 ml of 0.01 N HCl are mixed (molar ratio of TEOS/H₂O=1/16 and of TEOS/HCl=333/1), and the mixture is kept with mechanical stirring during the necessary time (about 30 minutes) to obtain a single-phase solution, with temperature being controlled by means of an external cooling bath, so that the reaction temperature never exceeds 30° C. The clear solution (pH 2.2–2.4) is kept with stirring at the temperature of about 25° C. during a further hour and then is stored at the temperature of 5° C. until time of use. Silica concentration is approximately of 116 g/l.

(B) Sol emulsifying

This step is carried out inside a pressurized laboratory reactor (Büchi) of 1 liter of capacity and equipped with: temperature control by thermocryostat, nitrogen pressurizing system, mechanical turbine stirring means (with six radial blades), driven by a controlled-speed ratiomotor, internal dipleg (of 5 mm of inner diameter) and fitting for reactants loading and venting outlet. The dipleg is connected, through a ball valve, with the emulsifying tube (inner diameter 3 mm, length 500 cm), leading the emulsion to the cylindrical glass reactor (of 100 mm of inner diameter) of 1 liter of capacity, equipped with controlled-speed turbine stirrer (with 6 inclined radial blades).

To the Büchi reactor, 100 ml of sol [prepared as disclosed under (A) above], and 300 ml of 1-decanol (Fluka) are charged, then the reactor is thermostatted at 20° C., with the contents thereof being kept with stirring (300 rpm) for 5 minutes. The reactor is then pressurized (up to 3 bars) with nitrogen and the pre-emulsion is discharged through the purposely provided ball valve, through the emulsifying tube, into the sol gelation bath constituted by a cyclohexylamine (15 ml) solution in 1-decanol (150 ml), kept with stirring (300 rpm) at the temperature of 20° C. Into the gelation reactor 300 ml of emulsion is discharged during 27 seconds; the linear speed of emulsion flow through the tube resulted to be of 1.60 m/sec. The so obtained silica gel is kept with stirring during 30 minutes, is filtered, is washed with EtOH and is dried under reduced pressure (0.1 bars) at 30° C. The granulometric analysis of the product displayed that the latter was constituted by spherical particles with average diameter $D_{(50)}$=30 micrometers and with a ratio of $D_{(90)}/D_{(10)}$=2.3.

EXAMPLE 2

Relatively to Example 1, a silica sol synthetized at pH 2.7 is used. 114 ml of TEOS (0.5 mol) is mixed with 142 ml of demineralized H₂O and 5 ml of 0.01 N HCl solution. Apart from the above, the process was carried out as in Example 1.

By operating with a linear speed of 1.6 m/sec, spherical particles of silica with average diameter $D_{(90)}$ of 33 micrometers and with a ratio of $D_{(50)}/D_{(10)}$=2.3, were obtained.

EXAMPLE 3

Relatively to Example 1, a silica sol is used with a molar composition of TEOS/H₂O=1/24 and TEOS/HCL=214/1, with pH=2.2. Silica concentration is approximately of 90 g/l.

By operating under the same conditions as of Example 1 and with a linear speed of 1.35 m/sec, spherical particles with average diameter $D_{(50)}$=37 micrometers and a ratio of $D_{(90)}/D_{(10)}$=2.3 were obtained.

EXAMPLES 4–8

As compared to Example 1, the emulsifying temperature (T) and the linear speed (V) of emulsion flow through the tube are changed by operating under different reactor pressure conditions; the gelation temperature was kept at 20° C. The obtained experimental results are reported in following Table 1.

TABLE 1

| EXAMPLE No. | T ° C. | V m/sec | $D_{(50)}$ micrometers | $D_{(90)}/D_{(10)}$ |
|---|---|---|---|---|
| 4 | 10 | 1.06 | 40 | 1.9 |
| 5 | 10 | 1.43 | 28 | 2.2 |
| 6 | 40 | 1.66 | 34 | 1.9 |
| 7 | 40 | 1.20 | 46 | 1.9 |
| 8 | 40 | 1.14 | 54 | 2.0 |

An increase in linear flow speed inside the tube causes a decrease in particle diameter; with the conditions of linear speed being the same (Example 2 and 6), an increase in the emulsifying temperature causes an increase in average particle diameter.

EXAMPLES 9–13

Relatively to the above examples, the geometric features, i.e., length (L) and inner diameter ($\emptyset_1$), of the emulsifying tube are changed. The same silica sol as disclosed in Example 1 is used.

The operating modalities (emulsifying temperature, ratios between the emulsion components and sol gelation) are similar to as disclosed in Example 1. The experimental results obtained are reported in following Table 2.

TABLE 2

| EXAMPLE No. | TUBE $\phi_1$ (mm) | L (cm) | V (m/sec) | $D_{(50)}$ $\mu$m | $D_{(90)}/D_{(10)}$ |
|---|---|---|---|---|---|
| 9 | 1.8 | 300 | 1.12 | 26 | 2.3 |
| 10 | 1.8 | 150 | 1.12 | 48 | 2.4 |
| 11 | 3.0 | 150 | 1.30 | 33 | 2.2 |
| 12 | 3.0 | 50 | 0.37 | 54 | 2.3 |
| 13 | 4.5 | 1100 | 1.68 | 25 | 2.5 |

EXAMPLES 14–15

Example 1 is repeated by using 2-ethyl-hexanol instead of 1-decanol. The experimental results obtained are reported in Table 3.

TABLE 3

| EXAMPLE No. | V m/sec | $D_{(50)}$ micrometers | $D_{(90)}/D_{(10)}$ |
|---|---|---|---|
| 14 | 1.79 | 40 | 2.4 |
| 15 | 1.56 | 45 | 2.5 |

As compared to 1-decanol (Example 1), 2-ethyl-1-hexanol supplied particles with a higher average diameter.

EXAMPLE 16

Example 1 is repeated using a hybrid silica sol.
(A) Predispersion of fumed silica
To a glass reactor of 1 liter of capacity, equipped with temperature control means and with a stirrer of fast dispersor type (Ultraturrax T50 ex Ika-Werk), 500 ml of demineralized water is charged followed, with stirring (6,000 rpm), by 60 g of fumed silica (Cab-O-Sil 200), added as small portions during approximately 30 minutes. At the end, stirring is continued for further 15 minutes; during the dispersion operation, temperature is maintained at 20–25° C.
(B) Preparation of hybrid silica sol
100 ml of sol of Example 1 is mixed, with mechanical stirring and at the temperature of 20° C., with 20 ml of the previously prepared fumed silica dispersion. The resulting hybrid sol has the following composition: weight ratio of (fumed silica)/(sol silica) $[(SiO_2)_p/(SiO_2)_s]=0.2$; molar ratio of (ethyl alcohol)/(total silica) $EtOH/(SiO_2)_t=3.3$. The silica concentration in the sol is of approximately 116 g/l.
(C) Emulsifying the hybrid sol in 1-decanol
This step is carried out as disclosed in Example 1. By pressurizing the reactor to 3.5 bars and operating with a linear speed of 1.48 m/sec, spherical particles with diameter $D_{(50)}=31$ micrometers and ratio $D_{(90)}/D_{(10)}=1.9$ were obtained.

EXAMPLE 17

As compared to Example 16, the weight ratio of $(SiO_2)_p/(SiO_2)_s$ is changed from 0.2 to 0.3. By pressurizing the reactor to 3.5 bars as in Example 16, owing to the high viscosity of the system, the linear flow speed of the emulsion inside the tube resulted to be of 1.02 m/sec, with very polydispersed spherical particles with higher diameter than 500 micrometers being obtained.

EXAMPLE 18

As compared to Example 17, the molar ratio of $EtOH/(SiO_2)_t$ is changed. 100 ml of the sol used in Example 16 is mixed with 30 ml of fumed silica dispersion (Example 16, A) and 30 ml of ethanol. The composition of the so obtained mixture is as follows: weight ratio of $(SiO_2)_p/(SiO_2)_s=0.3$; molar ratio of $EtOH/(SiO_2)_t=5.1$. By pressurizing the reactor to 3.5 bars and operating with a linear speed of 1.57 m/sec, spherical particles were obtained with an average diameter $D_{(50)}=26$ micrometers and a ratio of $D_{(90)}/D_{(10)}=2.5$.

EXAMPLE 19

As compared to Example 16, the ratio of $(SiO_2)_p/(SiO_2)_s$ is changed from 0.2 to 0.5, with a molar ratio of $EtOH/(SiO_2)_t=5.6$ being maintained.
By pressurizing the reactor to 3.5 bars and operating with a linear speed of 1.59 m/sec, spherical particles were obtained with an average diameter $D_{(50)}=26$ micrometers and with a ratio of $D_{(90)}/D_{(10)}=2.5$.

EXAMPLE 20

The silica gel obtained in Example 1 is submitted to ageing in the presence of decanol and cyclohexylamine.
Referring to Example 1, at the end of sol gelation, the resulting gel was allowed to settle; the settled material ($SiO_2$, approximately 90 g/l) was then kept at 95° C. during 16 hours inside a sealed reactor. After cooling, the product was filtered off, washed with absolute ethyl alcohol, dried at 30° C. under reduced pressure (0.1 bars) and finally fired in air at the temperature of 550° C. during 10 hours, with the heating rate being kept controlled at 50° C./h.
The resulting xerogel displayed the following characteristics: specific surface area=330 $m^2/g$; specific volume of pores=1.19 $cm^3/g$; average diameter of pores=144 Å.

EXAMPLE 21

As compared to Example 20, the gel ageing is carried out at 70° C. with a xerogel displaying the following characteristics being obtained: specific surface area=578 $m^2/g$; specific volume of pores=1.56 $m^3/g$; average diameter of pores= 108 Å.

EXAMPLE 22

As compared to Example 20, the silica gel of Example 2 is used, with a xerogel being obtained which displays the following characteristics: specific surface area=400 $m^2/g$; specific volume of pores=1.46 $cm^3/g$; average diameter of pores=146 Å.

EXAMPLE 23

The silica gel obtained from Example 15 is submitted to ageing in the presence of ethylhexyl alcohol and cyclohexylamine at the temperature of 70° C. for 16 hours; the xerogel, fired at 500° C. during 10 hours, displayed the following characteristics: specific surface area=545 $m^2/g$; specific volume of pores=1.36 $cm^3/g$; average diameter of pores=100 Å.

EXAMPLE 24

The hybrid silica gel of Example 16 is submitted to ageing for 16 hours at 80° C. The process is then continued as disclosed in Example 20. The resulting xerogel displayed the following characteristics: specific surface area=459 $m^2/g$; specific volume of pores=1.33 $cm^3/g$; average diameter of pores=115 Å.

EXAMPLE 25

The hybrid silica gel of Example 17 is submitted to ageing at 90° C. during 16 hours. The process is then continued as disclosed in Example 20. The resulting xerogel displayed the following characteristics: specific surface area=425 m²/g; specific volume of pores=1.33 cm³/g; average diameter of pores=124 Å.

EXAMPLE 26

The hybrid silica gel of Example 19 is submitted to ageing at 85° C. for 16 hours. The process is then continued as disclosed in Example 20. The resulting xerogel displayed the following charactersitics: specific surface area =415 m²/g; specific volume of pores=1.52 cm³/g; average diameter of pores=146 Å.

COMPARATIVE EXAMPLES (1) Effect of ageing on product properties

A silica gel prepared according to the procedure as disclosed in Example 3 was used. At gelation end, the product was subdivided into 2 portions; the first portion, washed with EtOH and dried at 30° C. under reduced pressure (0.1 bars), was fired at 500° C. during 10 hours (slope 50° C./hour). The resulting product displayed the following characteristics: specific surface area=539 m²/g; specific volume of pores=0.54 cm³/g; average diameter of pores=40 Å. The second gel portion was submitted to ageing in the presence of the gelation mother liquors at 95° C.×8 h. The product, recovered as disclosed above and fired at 500° C.×10 h, displayed the following characteristics: specific surface area=421 m²/g; specific volume of pores=1.30 cm³/g; average diameter of pores=123 Å.

(2) Emulsifying by causing the emulsion to flow through a tube with controlled geometrics characteristics Referring to Example 1, the preliminary emulsion was directly discharged from reactor bottom into the gelation bath. Particles were obtained with an average diameter of 24 micrometers and with a granulometric distribution, $D_{(90)}/D_{(10)}$=7.7, decidedly poorer than of the product from Example 1.

(3) Use of solvents with chemical-physical characteristics different from the characteristics of the invention (a) By using the same apparatus and sol of Example 1, the silica sol was emulsified in n-hexane; as the gelation bath, a solution of cyclohexylamine in n-hexane was used. By operating with the same methodology as of Example 1, and with a flow speed of 1.5 m/sec, particles were obtained which had a very irregular morphology, and were aggregated.

(b) Instead of hexane (viscosity=0.4 Ps at 20° C.), vaseline oil (viscosity=20 cPs at 20° C.) was used during both emulsifying and sol gelation steps. With a flow speed of 1.38 m/sec, in this case too the morphology of the particles resulted to be very irregular.

(c) Analogous results were obtained with hexane:vaseline blends with different and controlled viscosities.

(d) Instead of paraffinic hydrocarbons (a, b, c), dimethyl carbonate was used during both the emulsifying and sol gelation steps; by operating with a flow speed of 1.38 m/sec, particles with very irregular morphology and aggregated were obtained.

(e) Example c was repeated using the hybrid sol prepared as disclosed in Example 16. An aggregated product with irregularly shaped particles was obtained.

What is claimed is:

1. A process for preparing porous spherical silica particles, comprising:
    (a) hydrolyzing a silicon alkoxide in an aqueous media at a temperature of less than or equal to 40° C. in the presence of an acid selected from the group consisting of a mineral acid and an organic acid form a colloidal silica solution having a pH of 1.5 to 3;
    (b) mixing the resulting colloidal silica solution from step (a) with an organic medium comprising at least one monofunctional alcohol having 8 or more carbon atoms, said monofunctional alcohol having a viscosity of greater than or equal to 8 cps and a dielectric constant greater than 4;
    (c) emulsifying the resulting mixture from step (b) at a temperature of 5 to 50° C.;
    (d) contacting at a temperature of 5 to 50° C. the resulting emulsion from step (c) with a basic solution comprising said monofunctional alcohol used in step (b) and a base soluble in said monofunctional alcohol to form a gel; and
    (e) heating the resulting gel from step (d) in the presence of said basic solution of step (d) at a temperature of 50 to 140° C. for 2 to 16 hours;
        wherein the process prepares porous spherical silica particles having:
        an average diameter of 10 to 100 micrometers;
        a monodispersion degree of less than or equal to 2.5,
        a specific surface area of 200 to 600 m²/g,
        a specific pore volume larger than 1 cm³/g, and
        an average pore volume of 80 to 250 Å.

2. The process of claim 1, wherein in step (d), said base is a cyclic amine.

3. The process of claim 1, wherein said silicon alkoxide is tetraethoxy-silicate and in step (a), a molar ratio of water to said tetraethoxy-silicate is 8 to 32; said acid has a pH of 2.2 to 2.8, and said acid is selected from the group consisting of hydrochloric acid, sulfuric acid, nitric acid, malonic acid and paratoluene-sulfonic acid.

4. The process of claim 1, wherein said monofunctional alcohol is selected from the group consisting of n-octanol, n-nonanol, n-decanol, n-undecanol, n-dodecanol, and isomers thereof.

5. The process of claim 1, wherein the emulsifying in step (c) is carried out at a temperature of 20 to 40° C.; and the heating in step (e) is carried out at a temperature of 70 to 95° C. for more than 4 hours.

6. The process of claim 1, wherein in step (d), said base is selected from the group consisting of cyclohexylamine, octadecylamine and alkanolamine.

7. The process of claim 1, wherein said acid in step (a) is nitric acid, said monofunctional alcohol is n-decanol; and said base in step (d) is cyclohexylamine.

8. The process of claim 1, wherein in step (c), the resulting mixture flows through a tube under laminar flow conditions at a linear speed of 0.3 to 3 m/sec.

9. The process of claim 8, wherein the linear speed is 1.2 to 1.9 m/sec.

10. A process for preparing porous spherical silica particles, comprising the steps of:
    (a) hydrolyzing a silicon alkoxide in an aqueous medium in the presence of a mineral acid or an organic acid to form a colloidal silica solution;
    (b) mixing the resulting colloidal silica solution with an organic medium comprising an alcohol having 8 or more carbon atoms;
    (c) emulsifying the resulting mixture;
    (d) contacting the resulting emulsion with a basic solution with the alcohol used in step (b) and a base soluble in the alcohol to form a gel; and
    (e) heating the resulting gel in the presence of the basic solution of step (d) at a temperature within a range from 50° C. to 140° C.

11. The process of claim 10, further comprising the step of dispersing fumed silica in the colloidal silica solution formed in step (a) prior to performing step (b).

12. The process of claim 11, wherein the fumed silica has a specific surface area from 50 $m^2/g$ to 300 $m^2/g$.

13. The process of claim 10, wherein step (b), the alcohol is selected from at least one member from the group consisting of n-octanol, n-decanol, n-dodecanol, and isomers of said alcohols.

14. The process of claim 10, wherein the base used in step (d) is an inorganic base.

15. The process of claim 10, wherein the base used in step (d) is an organic base.

16. The process of claim 15, wherein the organic base is a cyclic amine.

17. The process of claim 15, wherein the organic base is an aliphatic amine containing greater than 10 carbon atoms.

18. The process of claim 10 wherein in step (e) the heating temperature range is 70–95° C.

\* \* \* \* \*